United States Patent [19]

Myerscough

[11] 4,166,632
[45] Sep. 4, 1979

[54] BUMPER HITCH ASSEMBLY

[76] Inventor: Rex E. Myerscough, 2806
Edenwood, Clearwater, Fla. 33519

[21] Appl. No.: 876,025

[22] Filed: Feb. 8, 1978

[51] Int. Cl.² .................. B60D 1/00; B60D 1/04; B60D 1/06
[52] U.S. Cl. .................................... 280/502
[58] Field of Search ........................... 280/502, 500

[56] References Cited
U.S. PATENT DOCUMENTS 3,113,789  12/1963  Safford .................. 280/502
3,667,780   6/1972  Abromavage et al. ...... 280/502

Primary Examiner—Francis S. Husar
Assistant Examiner—Edmond G. Rishell, Jr.
Attorney, Agent, or Firm—Richard M. Saccocio

[57] ABSTRACT

A "rental" type of bumper hitch assembly is disclosed which includes a drawbar having a coupling mechanism attached to each end thereof, each coupling mechanism provides two points of attachment to the upper edge of a bumper of a towing vehicle, and one point of attachment to the lower edge of the bumper, the upper points of attachment include a chain having hooks on each end with the chain passing through a curved passageway in the bumper hitch, the lower point of attachment is accomplished by a chain connected to a tensioning bolt which bears against the bumper hitch.

11 Claims, 5 Drawing Figures

BUMPER HITCH ASSEMBLY

BACKGROUND OF THE INVENTION

1. Field of the Invention

This invention relates in general to hitches for connecting a towing vehicle to another vehicle to be towed such as a trailer, and in particular, to rental hitches which are easily connected to and disconnected from a bumper of a vehicle in order to provide economical, convenient and safe towing of trailers.

2. Description of the Prior Art

In the trailer rental business it is necessary to provide a customer with a trailer hitch which attaches to the bumper of the customer's vehicle, be it a truck, automobile or other similar type of vehicle. Typically, a customer will require such a hitch and trailer on a short time basis for such purposes as moving household goods which may range from relatively light loads to heavy loads. In general, a customer of this type is not in the hauling or moving business and is, therefore, not particularly adept nor acquainted with trailer hitch mechanisms. Thus, the trailer hitch must be relatively simple, from a mechanical standpoint, in order to allow a customer to connect and disconnect the hitch from the bumper of his automobile or truck. Yet, the connection must be such that the hitch is securely fastened to the bumper.

A typical customer must also be capable of properly orienting the hitch to his bumper so that the ball portion of the hitch is properly centered on the bumper and so that the vertical inclination of the ball allows proper connection to the connecting cup on the trailer. If the ball is not centered on the bumper, unbalanced loads will be applied to the towing vehicle, thereby causing difficulty in driving and, perhaps, even failure of the means used to connect the bumper to the towing vehicle. If the inclination of the ball, relative to the vertical, is not substantially in alignment therewith, then there is the possibility that the ball and the cup might become separated during towing.

The ease of connecting and disconnecting a trailer hitch to a bumper must be factored into the design of the hitch, but, the hitch must necessarily be sufficiently strong so as to adequately support the loads imposed upon it when towing. This latter aspect of strength tends to act contrary to simplicity of connection and disconnection. This is so because to be sufficiently strong, each of the components of the hitch assembly must individually be sufficiently strong, and usually this means the members must be made of metal and be relatively thick. The combined weight of the entire assembly is, therefore, quite heavy. A heavy assembly makes it difficult for a person to lift the assembly, hold it in its approximate position on the bumper, and then with one free hand couple the hitch to the bumper. The heavier the hitch, the more difficult is the task of making the connection. Therefore, a simple method of coupling the hitch to the bumper is essential.

In order to satisfactorily connect a hitch to a bumper, there are also a number of other factors to be considered. One is the cross-sectional shape of the bumper. Another is the curvature of the bumper around the body of the car.

The cross-sectional shape of a bumper varies from car to car, year to year, truck to truck, etc. Still, the portion of the hitch which abuts the bumper must fit all of the various cross-sectional shapes of bumpers.

The curvature of the bumper presents a substantial problem with most of the hitches of the present state of the art. Most modern hitches consist of a drawbar to which a towing ball is attached. At each end of the bar, a coupling mechanism is employed to attach the tow bar to the car. Most successful hitches employ coupling mechanisms having two connections to the upper edge of the bumper and one connection to the lower edge of the bumper. Thus, a three-point attachment technique is most often used. And, for ease of connection of the hitch to the bumper, most often one single tightening device is used to simultaneously tension all three bumper connections. The tensioning of the lowermost or bottom connection normally presents no problem; the tensioning of the uppermost connections, on the other hand, usually does cause problems. Bumper curvature is one aspect of the problem because the two uppermost connections are made with one chain which usually hooks onto the bumper, passes through a member operatively attached to the tightening device and then hooks onto the bumper at another location which is spaced apart from the first connection. Because a single chain is used to hook on to the upper edge of the bumper at two locations, it is very difficult to properly tension the chain. The net effect is that a loose connection results and, of course, this is not satisfactory.

In the prior art, various techniques are employed in an attempt to overcome the above stated problems. In U.S. Pat. No. 3,667,780 by J. C. ABROMAVAGE et al, filed March, 1971, a tension equalizer device is utilized which pivots so that both connections are equally tensioned. The resulting assembly, however, is quite complicated, requiring the use of a number of parts which adds to the weight of the assembly and detracts from the ease of connecting the hitch to the bumper. In U.S. Pat. No. 3,113,789 by T. W. SAFFORD, filed December, 1961, and No. 3,436,100 by J. C. ABROMAVAGE et al, the uppermost chain passes through a relatively large coupling which is attached to the bumper at a single place with two points of connection on the mechanism operatively attached to the tightening means. In these designs, unequal tensioning of the upper chain occurs.

Other designs simply ignore the apparent inability to obtain equal tensioning of both points of contact on the upper edge of the bumper. Still other designs utilize a single point of contact on both the upper and lower edges of the bumper which results in a relatively non-secure method of attaching the hitch to the bumper.

BRIEF SUMMARY OF THE INVENTION

The present invention overcomes the problems of the prior art by disclosing a hitch which is adapted to be attached at two spaced locations to vehicle bumpers regardless of shape or curvature and at each location provides for two points of attachment at the upper edge of the bumper with one point at the lower edge, with equal tension being applied to both upper points of attachment and yet provides for ease of connection and disconnection to the bumper.

The invention comprises a hitch having a coupling mechanism at each end of a drawbar. Each coupling mechanism includes a bumper abutting member which is box-shaped and encircles the drawbar and contacts the bumper at a vee-shaped end. A tensioning member fits within the abutting member and is pivotally pinned thereto. The tensioning member rests on two adjacent surfaces of the drawbar. An upper chain having two bumper coupling hooks thereon passes through a curved passageway in the tensioning member. A lower chain having one coupling hook thereon is attached to a bolt which is prevented from rotating and passes through a straight passageway in the tensioning member. The axis of the curved passageway and the axis of straight passageway are at substantially right angles to each other. A large winged nut connects the top part of the bolt to the tensioning member. By simply tightening the winged nut, all three hooks are simultaneously and firmly tightened onto the edges of the bumper. Moreover, the two uppermost points of connection are equally tensioned because of the curved passageway through the tensioning member.

BRIEF DESCRIPTION OF THE DRAWINGS

The invention disclosed herein will be better understood when taken in connection with the following description and drawings, in which.

DESCRIPTION OF THE PREFERRED EMBODIMENT

Figure 1:
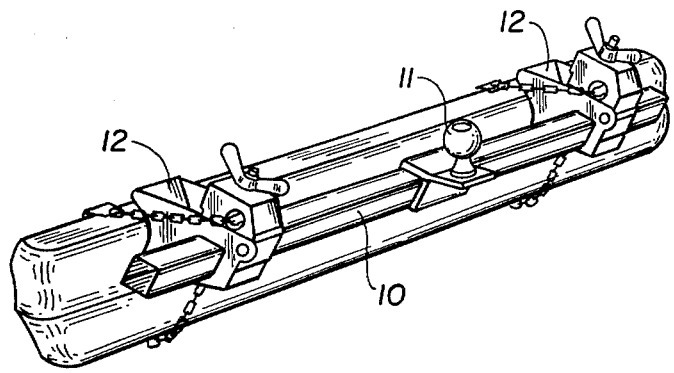
FIG. 1 is an isometric view of the bumper hitch assembly showing the bumper hitch clamped in position on a bumper, with the clamping mechanisms being positioned on opposite ends of the bumper.

Referring now to the drawings, FIG. 1 shows the bumper hitch assembly clamped in place on a typical bumper of an automobile. A hollow drawbar 10, having a square cross-sectional shape, has a hitching ball 11 conventionally attached thereto, and extends horizontally along the bumper. Each end of drawbar 10 passes through a clamping mechanism 12 and is securely fastened thereto in a manner which will become obvious as later explained. Clamping mechanisms 12 fasten the bumper hitch assembly to the bumper. As seen in FIG. 1, two such clamping mechanisms 12 are provided.

Each clamping mechanism 12 is generally positioned on the bumper at a location where the bumper is fastened to the chassis or body of the automobile. In this manner, loads of towing which are transmitted through hitch ball 11, to drawbar 10 and then through clamping mechanisms 12 to the bumper, are transmitted to the automobile in a way which minimizes the loading on the bumper, its attachment to the automobile chassis, and the chassis itself.

Figure 2:
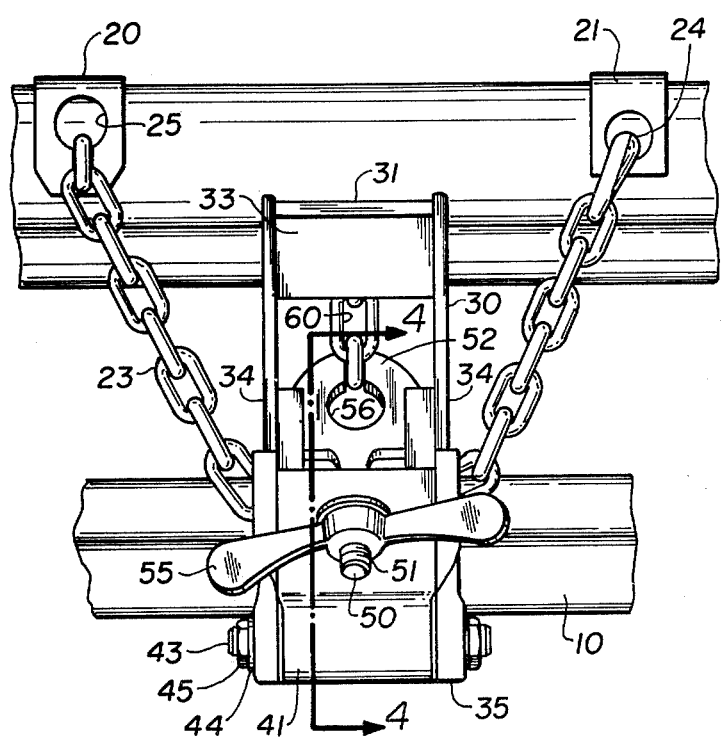
FIG. 2 is a plan view of one of the bumper clamping mechanisms of FIG. 1 in position on a portion of the bumper.
Figure 3:
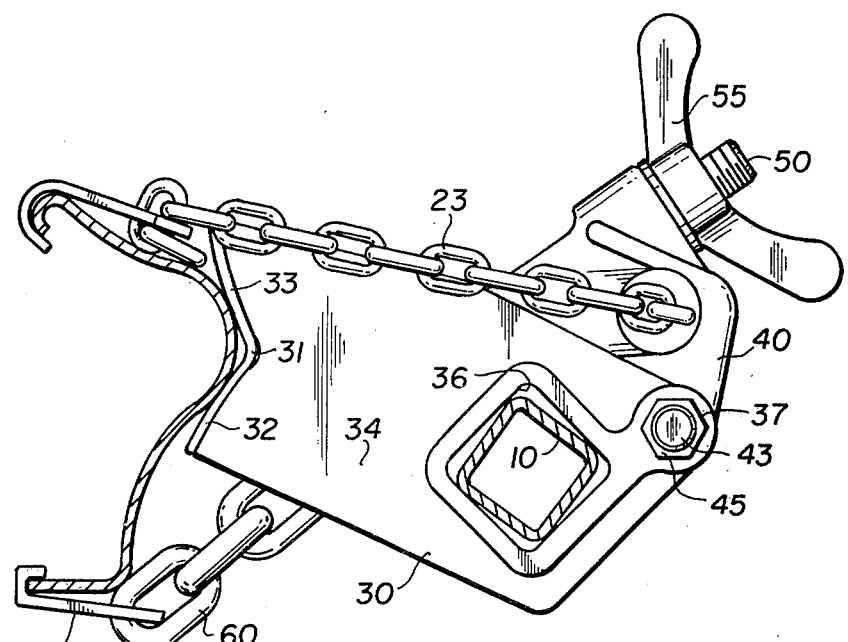
FIG. 3 is a side view of one of the bumper clamping mechanisms of FIG. 2.

The details of the clamping mechanisms 12 are shown in FIGS. 2 and 3. In FIG. 2, it is clearly seen that the clamping mechanism 12 is clamped to the upper edge of the bumper in two locations through the use of clamps 20 and 21. A third clamp 22 is used to clamp to the bottom edge of the bumper. The resulting three point clamping lends itself to very stabile attachment of the mechanism 12 to the bumper. Most advanced hitches utilize this three-point clamping arrangement because of the towing stability thereby achieved. Any rotational forces applied to mechanism 12 are resisted by clamps 20 and 21 in the horizontal plane, and are resisted by the combination of clamps 20 and 21 in conjunction with clamp 22 in the vertical plane. In this manner, the loads due to towing, including impact shock loads from abrupt starting and stopping, are effectively counteracted and, therefore, the possibility of the hitch becoming unattached from the bumper is minimized.

A single chain 23 having an adjustable working length is permanently attached at one end to clamp 21 by means of a monkey link 24 or other similar type of connecting link. Chain 23 is adjustably attached to clamp 20 by means of opening 25 in clamp 20. Opening 25 comprises a keyhole type of opening, that is, a round, larger opening having a smaller elongated slot eminating therefrom. The round opening is large enough to accept the passage of chain 23 therethrough. The elongated slot will only pass the thickness of a link of chain 23; the adjacent link, which is at a substantially right angle thereto, will not pass through the slot. In operation, chain 23 is fed through the larger round opening until the desired working length of chain 23 is obtained. Then the link of chain 23, which is then at the location of clamp 20, is positioned within the elongated slot. The link immediately forward thereto is then at a right angle to the slot thereby preventing this forward link from passing the slot. Tightening of chain 23 causes the forward link to securely bear against and thus lock to the clamp 20.

A bumper abutting member 30 having a vee-shaped end 31 bears against the outer surface of the bumper. The vee-shape 31 allows abutting member to bear against a rounded bumper in two horizontally spaced places. This too adds to the overall stability of the hitch assembly. Because the lower surface 32 of end 31 is more vertical than the upper surface 33, the end 31 is easily adapted to a bumper having a substantially flat outer surface. End 31, therefore, adapts to a large variety of bumper shapes.

Abutting member 30 further comprises a pair of spaced parallel plates 34 which form the sides thereof. End 31 is attached to sides 34. Back plate 35 is integrally connected to sides 34 of the distal end of abutting member 30 to form a box-like member having substantial stiffness. The individual components of bumper abutting member 30 may be fashioned by a single casting, or by a welded assembly. Openings 36 in sides 34 provides for the insertion therethrough of drawbar 10. Openings 36, thus, have a substantially square configuration. A round opening 37 is further provided in sides 34 for attachment of tensioning member 40. Openings 37 are located to the rear of openings 36, or such that openings 36 are located between end 31 and openings 37.

Figure 4:
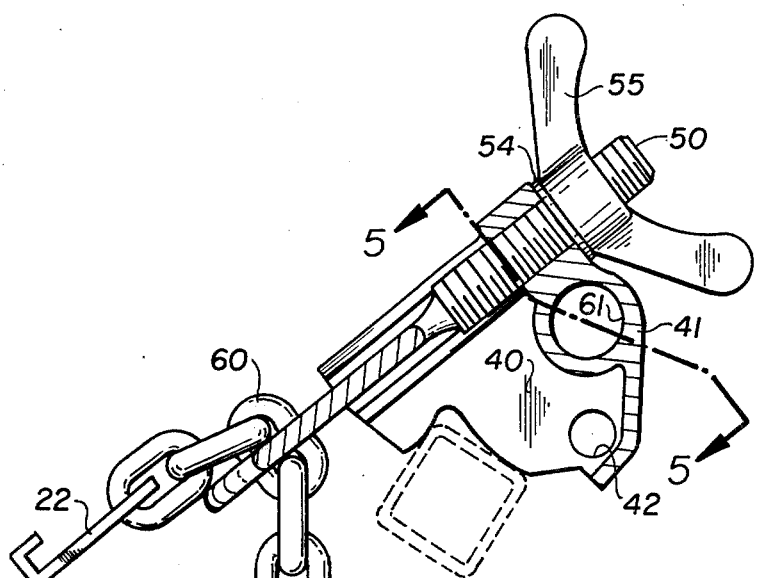
FIG. 4 is a cross-sectional view of the tensioning member of the bumper clamping mechanism taken along the line 4—4 showing the single tightening member; and, FIG. 5 is a cross-sectional view of the tensioning member of FIG. 4 taken along the line 5—5 showing the curved passageway for the upper clamping member.

Tensioning member 40 includes a housing 41, having an opening 42 therethrough as shown in FIG. 4. Opening 42 has a round configuration so as to allow the housing 41 to be connected to abutting member 30 by a bolt 43 which fits through openings 37 and 42 when these openings are aligned. A conventional locking washer 44 and nut 45 is employed in conjunction with bolt 43 to securely fasten abutting member 30 to housing 41. The opening 42 in housing 41 is slightly larger than the diameter of bolt 43 so that housing 41 can pivot about bolt 43. As shown in FIG. 2, housing 41 fits within abutting member 30 with clearance between the inside of sides 34 and the outside of housing 41. This further allows housing 41 to pivot about bolt 43, when the housing 41 is bolted in place within abutting member 30.

A tensioning bolt 50 having a rounded and threaded portion 51 and a flattened portion 52 as shown in FIG. 2 is positioned within housing 41. The rounded end 51 fits within a round hole in housing 41. The edges of flattened portion 52 fit within grooves 53 in housing 41. A locking washer 54 and a winged nut 55 are attached to the threaded end 51 of bolt 50 which extends outside of housing 41. By turning winged nut 55, bolt 50 moves either into or out of housing 41. In this way, as explained below, the clamping mechanisms and hence the hitch assembly, is fastened to the bumper of an automobile or other vehicle.

Another keyhole type of an opening 56 is provided in flattened portion 52 of bolt 50. Opening 56 is similarly shaped to opening 25 and operates in the same manner, as previously explained. A single chain 60 is permanently attached to clamp 22 which attaches to the lower edge of the bumper. The free end of chain 60 is fitted within opening 56 and is secured therein by means of the elongated slot portion of the opening and the right angle aspect of connecting links of chain 60.

Figure 5:
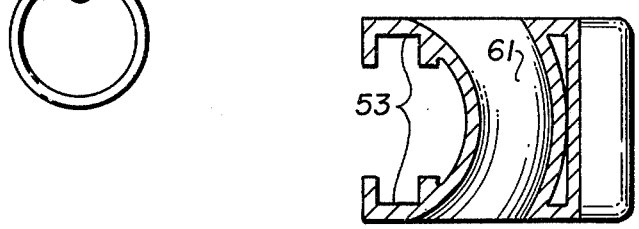

A curved annular opening 61 is provided in housing 41 as shown in FIG. 5. Opening 61 is located between opening 42 and the opening for bolt 50 in housing 41. Opening 61 curves away from opening 42 and toward the opening for bolt 50. Chain 23 fits within opening 61 as shown in FIG. 3. FIG. 4 shows the approximate position of drawbar 10 (shown in phantom) with relation to housing 41 when the hitch assembly is secured to an automobile.

In order to attach the hitch assembly to a bumper of an automobile or similar vehicle, the following procedure is utilized. The clamping mechanisms 12 are attached to and are roughly positioned on drawbar 10. Chain 23 of one of clamping mechanisms 12 is fitted to coupling 20 so that the length of chain 23 allows the bumper abutting member 30 to bear against the bumper and also allows clamps 20 and 21 to be attached to the upper edge of the bumper. In similar fashion, the upper chain 23 of the other clamping mechanism 12 is attached to the other end of the bumper. The hitch assembly is now fully supported by the bumper and both hands of the installer are free to hook up the lower chains 60 to the bottom edge of the bumper and to accurately position the hitch on the bumper. If the hitch needs to be moved sideways, clamps 20 and 21 of both clamping mechanisms 12 are moved in the desired direction. If only one of the clamping mechanisms 12 needs to be moved, clamps 20 and 21 of that mechanism 12 are moved in the desired direction and then abutting member 30 and tensioning member 40 are jointly moved in the same desired direction while the drawbar 10 is held stationary. If the hitch assembly needs to be lowered or raised, the length of chains 23 are accordingly adjusted. Clamps 22 of each mechanism 12 now attached to the bottom edge of the bumper and the length of chains 60 are adjusted within the lower portion 52 of bolt 50 so as to eliminate all but a small amount of slack.

Wing nuts 55 of each mechanism 12 are then turned by hand eliminating the remaining slack in chains 60 and, at the same time, causing the housing 41 of tensioning member 40 to pivot on bolt 43 and bear against the flat surface of drawbar 10. Further turning of wing nuts 55 causes the entire hitch assembly including drawbar 10, abutting members 30 and tensioning members 40 to move vertically down and thereby causes any slack in chains 23 to be taken up. When all the slack in chains 23 is eliminated, clamps 20 and 21 firmly and positively seat against the upper edge of the bumper and drawbar 10 is wedged in position in openings 36 of abutting members 30. Since bolts 50 move in a generally upward direction when wing nuts 55 are turned, lower chains 60 are simultaneously tensioned along with upper chains 23. Consequently, lower clamps 22 are also firmly and positively seated against the lower edge of the bumper and the entire hitch assembly is firmly affixed to the bumper.

It is to be noted that the curved openings 61 in housings 41 allow for equalizing the tension in each leg of upper chains 23 without the need for separate equalizer link. This is so, notwithstanding that because of the shape of a particular bumper, one leg of chain 23 may be longer than the other leg of chain 23. Under such a condition, the curved annular passage 61 allows for a lateral shift of the center point of the reactive forces, along the curved passage 61, by the tensioning member 40. And, it is to be noted that while the curved passageway 61 allows for a shift in the reactive center point, it also allows the resultant reactive force to bisect the angle between the legs of chain and yet the reactive loads are distributed along the length of the curved passageway 61. Such a beneficial result is not possible with the trailer hitches of the prior art including the type having a tension equalizer device.

It is further to be noted that the disclosed trailer hitch provides for both upper and lower chains 23 and 60, respectively, to be anchored to a single member, to wit: tensioning member 40.

While other modifications of this invention and variations of apparatus may be employed within the scope of this invention and have not been described or illustrated, the invention is intended to include all such modifications as may ordinarily be embraced within the following claims.

I claim:
1. A hitch adapted to be attachable to a bumper of a vehicle for towing another vehicle comprising:
 (a) a drawbar comprising an elongated bar;
 (b) hitch means attached to said drawbar adapted for connecting a vehicle to be towed to a towing vehicle;
 (c) clamping means attached to said drawbar and adapted to connect said drawbar to a bumper of a towing vehicle comprising:
  (i) a bumper abutting member having a first opening therethrough for receiving said drawbar, an edge adapted to abut said bumper, said bumper abutting member extending from said drawbar to said abutting edge, a second opening therethrough comprising a curved annular passageway, said curved passageway having openings directed toward said abutting edge;
  (ii) locking means for locking said hitch to said drawbar, said locking means being in pivoting contact with said abutting member;
  (iii) first hook means for attaching said hitch to at least two laterally spaced locations to one substantially horizontal edge of said bumper, said first hook means being received within said curved passageway;
  (iv) second hook means for attaching said hitch to at least one location on a second substantially horizontal edge of said bumper, said second hook means being threadingly connected to said abutting member.

2. The hitch of claim 1, wherein said clamping means comprises at least two clamping mechanisms, each comprising said bumper abutting member, said locking means and said first and second hook means, each clamping mechanism being adjustably positioned along the length of said drawbar.

3. The hitch of claim 1, wherein said first hook means comprises a first hook, a second hook and a first flexible elongated member, said first flexible member being interposed between said first and said second hooks and being connected thereto, said first flexible member being received and adjustably positioned within said curved passageway in the abutting member.

4. The hitch of claim 3, wherein said first flexible member comprises a first chain having a plurality of interconnecting links.

5. The hitch of claim 1, wherein said second hook means comprises a hook, a bolt and a flexible elongated member, said flexible member being interposed between and connected to said hook and an end of said bolt.

6. The hitch of claim 5, wherein said flexible member comprises a chain having a plurality of interconnecting links and said end of said bolt includes slot means for connecting said chain to said bolt and for adjusting the length of said chain.

7. The hitch of claim 5, wherein said locking means comprises a locking member having an opening for passage of said bolt therethrough, a nut threadingly engaged on said bolt, said nut being in bearing contact with a surface of said locking member, said locking member, said pivoting contact of said locking means with said abutting member, said drawbar and said drawbar opening in the abutting member being positioned such that, when said hitch is attached to said bumper, tightening of said nut causes said locking member to pivot on said abutting member and to bear against said drawbar whereby said drawbar is firmly clamped to said abutting member and said hitch is firmly clamped onto said bumper.

8. The hitch of claim 7, wherein said locking member has a vee-shaped notch therein, said notch having two surfaces which bear against said drawbar.

9. The hitch of claim 7, wherein said first hook means comprises a first hook, a second hook, and another flexible elongated member, said another flexible member being interposed between said first and said second hooks and being connected thereto, said another flexible member being adjustably received within said curved passageway in the abutting member.

10. The hitch of claim 9, wherein said another flexible member comprises another chain having a plurality of interconnecting links and said flexible member comprises a chain having a plurality of interconnecting links and said end of bolt includes slot means for connecting said chain to said bolt and for adjusting the length of said chain.

11. The hitch of claim 6, wherein said bolt has a flattened portion at said end having said slot means, and said abutting member has one or more grooves therein, said flattened portion of said bolt slidingly fitted with said one or more grooves.

* * * * *